United States Patent [19]
Gondek

[11] Patent Number: 5,982,990
[45] Date of Patent: Nov. 9, 1999

[54] METHOD AND APPARATUS FOR CONVERTING COLOR SPACE

[75] Inventor: Jay A Gondek, Camas, Wash.

[73] Assignee: Hewlett-Packard Company, Palo Alto, Calif.

[21] Appl. No.: 08/869,161

[22] Filed: Jun. 4, 1997

Related U.S. Application Data

[63] Continuation-in-part of application No. 08/680,084, Jul. 15, 1996, abandoned, and a continuation-in-part of application No. 08/504,406, Jul. 20, 1995, Pat. No. 5,748,176.

[51] Int. Cl.⁶ ................................................. G06F 15/00
[52] U.S. Cl. ........................................ 395/109; 358/518
[58] Field of Search ................................ 395/109, 101; 358/500, 502, 507, 515, 518, 523, 525, 534, 535, 536, 501, 520, 504, 298, 459, 455, 456, 457, 458; 382/162, 163, 167; 345/153, 154, 155, 150, 151

[56] References Cited

U.S. PATENT DOCUMENTS

| | | | |
|---|---|---|---|
| 4,334,240 | 6/1982 | Franklin | 358/78 |
| 4,477,833 | 10/1984 | Clark et al. | 358/80 |
| 4,930,018 | 5/1990 | Chan et al. | 358/298 |
| 5,020,014 | 5/1991 | Miller et al. | 364/723 |
| 5,049,986 | 9/1991 | Aono et al. | 358/80 |
| 5,111,302 | 5/1992 | Chan et al. | 358/298 |
| 5,148,501 | 9/1992 | Enomoto et al. | 382/56 |
| 5,149,960 | 9/1992 | Dunne et al. | 250/226 |
| 5,181,014 | 1/1993 | Dalrymple et al. | 340/703 |
| 5,241,373 | 8/1993 | Kanamori et al. | 358/27 |
| 5,264,927 | 11/1993 | Miyoshi et al. | 358/527 |
| 5,390,035 | 2/1995 | Kasson et al. | 358/518 |
| 5,428,465 | 6/1995 | Kanamori et al. | 358/518 |
| 5,485,180 | 1/1996 | Askeland et al. | 347/15 |
| 5,533,173 | 7/1996 | Wober et al. | 395/114 |
| 5,539,540 | 7/1996 | Spaulding et al. | 358/518 |
| 5,553,199 | 9/1996 | Spaulding et al. | 395/109 |
| 5,581,376 | 12/1996 | Harrington | 358/518 |
| 5,600,764 | 2/1997 | Kakutani | 395/131 |
| 5,625,378 | 4/1997 | Wan et al. | 345/150 |
| 5,748,176 | 5/1998 | Gondek | 345/131 |

*Primary Examiner*—Dov Popovici
*Attorney, Agent, or Firm*—H. Brian Davis

[57] ABSTRACT

An ink-jet printing system and method are disclosed which convert monitor-based RGB images to an image represented in CMYLcLmK, in which Lc is a low-dye-load cyan and Lm is a low-dye-load magenta. The method provides a color cube matrix in RGB color space, with a finite set of control points within this color cube. Each control point has a corresponding set of parameters in the CMYLcLmK color space. The control points provide transition points between use of high-dye-load inks and low-dye-load inks to enhance the color image, especially in areas where high-dye-load inks would cause graininess. Based on this set of control point an interpolation is made to arrive at CMYLcLmK parameters of any point in the cube.

2 Claims, 1 Drawing Sheet

METHOD AND APPARATUS FOR CONVERTING COLOR SPACE

RELATED CASE INFORMATION

This application is a continuation-in-part of my application Ser. No. 08/680,084, filed Jul. 15, 1996, entitled Method and Apparatus for Converting Color Space (now abandoned) and Ser. No. 08/504,406 filed Jul. 20, 1995, entitled Method For Multi-Variable Digital Data Storage and Interpolation now issued as U.S. Pat. No. 5,748,176, both of which are incorporated herein by this reference.

BACKGROUND OF THE INVENTION

1. Field of the Invention

This invention relates to a method and apparatus for converting an image from RGB (red, green, blue) color space (suitable for viewing on a computer monitor) to a six plane CMYLcLmK (cyan, magenta, yellow, light cyan, light magenta, and black) color space suitable for printing on a digital color printer, such as an ink-jet printer.

2. Statement of the Art

Color images are typically represented in computer memory by a combination of primary colors at selected levels or intensities. For transmitted light (such as that which comes from a computer screen), the visible spectrum is typically divided between three additive primary colors red, green and blue (RGB). When red, green and blue are all combined white (W) results, and when none of these colors is used, black (K) results (the absence of light).

When colors are deposited on a print medium, the subtractive primary colors cyan, magenta and yellow (CMY) are typically used. When a dye, pigment or other colorant is placed on a sheet of paper or other medium, the colorant serves to absorb certain frequencies of light and reflect or transmit others. When a theoretical ambient white light is reflected from or filtered through such colorants, the colorants subtract specific frequencies from and reflect or transmit the desired color. The addition of all three subtractive primaries results in black, and when no subtractive colors are used, all light is reflected or transmitted, and white results.

The relationship between the RGB and CMY color schemes can be represented with the following simple algebraic formulas:

| | |
|---|---|
| R + G + B = W | C + M + Y = K |
| R + G = Y | C + M = B |
| R + B = M | C + Y = G |
| G + B = C | M + Y = R |

Each of these color schemes can be represented as a three-dimensional coordinate system, thus defining a color space. Selected points along the axes representing the full primary color form vertices of a color cube. Theoretically, any color can be represented by a point within this cube. An RGB color space is shown in FIG. 3, with the points R (red), G (green), and B (blue) forming vertices of the color cube. The vertex of this cube where R, G, and B each equal 0 (point 0,0,0) is K (black), and the vertex of the cube comprising the addition of all three additive colors results is W (white). Consistent with the above formulas, the other three vertices are C (cyan), M (magenta) and Y (yellow). Color spaces are not limited to three dimensions. For example, subtractive colors are often represented in four color CMYK color space.

Computer monitors, such as cathode ray tubes (CRT's), produce what may be termed "near-analog" color. Each pixel on a computer screen can be represented by 256 different levels (0 to 255) of each primary color. With 256 different levels for each primary color, CRT's come close to being analog, since this number of intensity levels is well beyond the ability of the human eye to resolve. However, with dot printers, such as inkjet printers, each pixel can typically be represented by only two levels: on or off. To convert from the near-analog CRT image to the digital printer image, a process of halftoning is typically used. Halftoning methods evaluate the near-analog intensity level for each color at each pixel and use either a dithering or error diffusion algorithm to decide for that pixel whether or not to print a dot of that color. Halftoning can be done either before or after the color conversion from the monitor RGB color space to the output color space (e.g., CMY or CMYK).

As stated, dot printers, such as ink-jet printers, are digital printing devices, as opposed to being analog or near analog. If only a single dot of each color is used, a CMYK printer can produce 8 different colors at any given pixel: C, M, Y, R, G, B, K, and W (white being the absence of any ink dots). The digital nature of dot printers thus greatly limits the image quality obtained.

The quality of images would be dramatically increased if dot printers could be made to behave more like analog devices. Various methods have been devised to increase the number of color choices for each pixel. Some of these methods include using multiple droplet sizes, using multiple smaller dots of the same color per pixel, using dots of differing dye loads, and attempts to dynamically vary the droplet size.

The present invention is disclosed in terms of an ink-jet printer that can print two dye loads for the colors cyan and magenta, a full or "high" dye load and a reduced or "low" dye load. Thus, the available choices available are C, M, Y, Lc, Lm, and K, where Lc is cyan-low and Lm is magenta-low. Yellow is printed only in a full dye load because different levels of yellow are less discernible by the human eye than differing levels of the other primaries. The range of potential colors obtainable with this scheme is greatly increased, and results in much improved image quality.

When an image on a computer screen is printed on an output device, such as a color printer, a color conversion must be made from RGB color space to CMY or CMYK color space. It would seem that a simple algebraic manipulation using the above formulas would provide this conversion. However, in practice, a strict algebraic conversion does not result in a true color mapping of what is seen on the CRT to what results on the page. This non-linearity from the CRT to CMY(K) output results from many factors, such as the halftoning method used, the nature of the media, inks or colorants, etc.

Various methods have been devised to make the colors printed on the page more true to those seen on the CRT. These methods are typically based on empirically derived curves or formulas that have been found to best approximate the color seen on the CRT to that which is printed on the particular printing device used. To avoid excess computation time, these color conversion methods typically involve look-up tables. A large number of potential colors per pixel are available on the CRT, as represented by the fact that each primary color has 256 potential levels. Thus, the CRT has a total of 256×256×256, or 16,777,216 potential colors per pixel. In the CMYLcLmK printer mentioned, each of these colors must be mapped in memory or converted to its own combination of each of the 6 available choices of dots. A simple look-up table for each of the 16,777,216 colors would use an unacceptably large amount of memory.

SUMMARY OF THE INVENTION

The invention provides a printing mechanism and color conversion method for converting from a near-analog color space to a multi-dimensional output. The output color space has at least one color that has at least two output options. The method comprises the steps of (a) providing a set of control points within the near-analog color space, each of the control points having a corresponding set of parameters in the output color space, and the control points providing transitions between the options of the at least one color having at least two output options; and (b) interpolating selected points within the near analog color space between the control points to determine parameters of the selected points in the output color space.

DETAILED DESCRIPTION OF THE ILLUSTRATED EMBODIMENT

Figure 1:
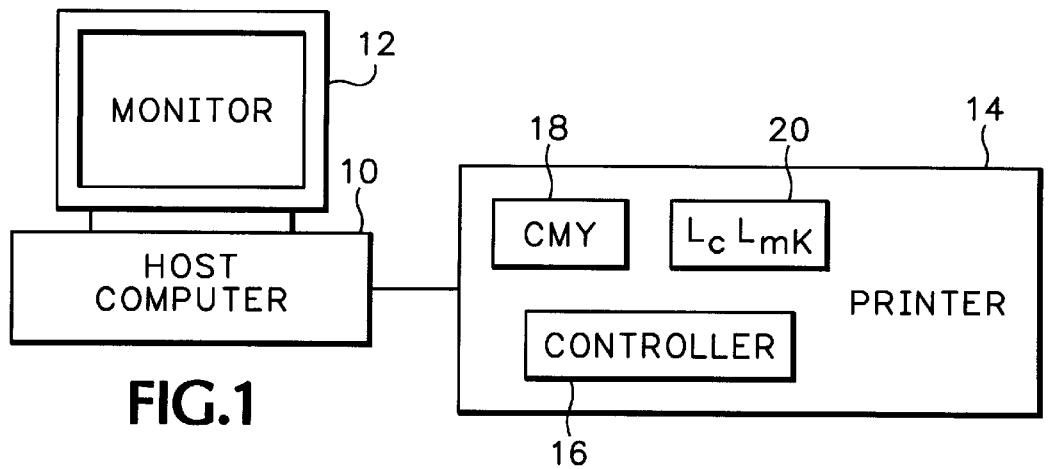
FIG. 1 is a schematic illustration of a printing system of the invention.

FIG. 1 is a schematic diagram of a printing system of the invention. This system includes a host computer 10, monitor (CRT) 12, and printer 14. Printer 14 includes a printer controller 16 and print cartridges 18 and 20. In the disclosed embodiment, print cartridges 18 and 20 are scanning print cartridges. In other words, they are driven back and forth across a print swath over the print medium (e.g., paper), and the print medium is driven through the printer. In this way, the entire print region of the page can be addressed to fill the region with text or graphics.

Print cartridge 18 is a 300 dot-per-inch (DPI) three-chamber cartridge containing three types of ink: cyan (C), magenta (M), and yellow(Y). This is a standard type of print cartridge that has been in use previously. Print cartridge 20 is a modified version of cartridge 18, but the three chambers contain low cyan (Lc), low magenta (Lm), and black (K). The high and low dye loads of the disclosed printer were chosen such that the low dye-load inks have approximately 20% of the dye load of the high dye-load inks. The dye loads are chosen so that four theoretically linearly increasing levels can be achieved in these colors when the dots are laid down on the page. For example, in magenta, these levels would be produced by the following combinations 0 (no dots), Lm, M, and M+Lm. One might think that a 50% dye loading for the low-dye ink would be the correct choice for such a linearly increasing level, but it has been empirically found that a 20% dye loading produces better results.

Figure 2:
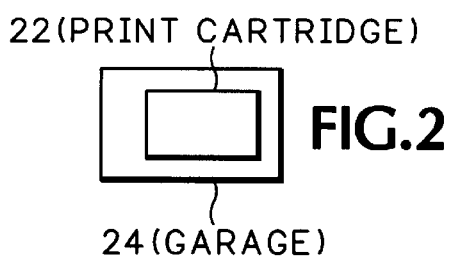
FIG. 2 is a schematic illustration of a print cartridge garage.

Cartridge 20 is interchangeable with a separate cartridge 22 (FIG. 2) containing only black. When cartridge 20 or 22 is not installed in printer 16, it may be kept in a "garage," 24 (FIG. 2) which keeps the printhead from desiccating. Current printers commonly incorporate a black cartridge and a CMY cartridge. The system shown in FIG. 1 is a modification of this basic design to provide for enhanced image quality. Thus, an existing printer design is modified to provide dramatically enhanced image quality when printing in color by providing a carriage that will accept either a black cartridge or a color cartridge with reduced dye loads in cyan and magenta and a smaller black chamber.

Figure 4:
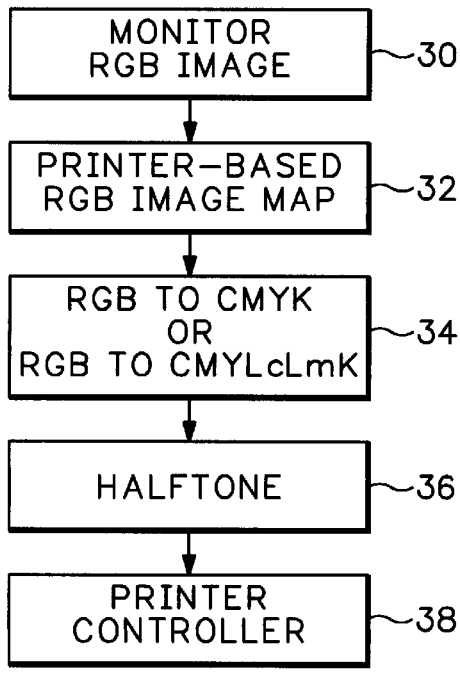
FIG. 4 is a flow diagram of information between a host device and a printer.

FIG. 4 illustrates the standard flow of information from the computer 10 to the printer 14. An image is first created or introduced into the memory of computer 14. To be displayed on the computer monitor 12, this image is represented in additive RGB color space. Each pixel on the screen can be illuminated in each color red, green and blue at any one of 256 (0 to 255) levels of intensity. 256 levels is considered to be near analog, since this number of levels is beyond the ability of the human eye to resolve. The three colors can be combined in their respective 256 levels to produce over 16 million potential colors at each pixel. It takes 8 bits to represent 256 levels ($2^8$=256). Each of the three primary colors require 8 bits; therefore, RGB color monitors are commonly referred to as producing 24-bit color (3×8=24). This image is represented at the spatial resolution of the particular monitor. Typical monitors have 75 pixels per linear inch (75 DPI) in both vertical and horizontal directions.

At step 30, the 24-bit RGB color image is held in memory of computer 10 so that it can be displayed on monitor 12. At step 32, image 30 is converted to a 24-bit RGB image at the resolution of the printer. Typical ink-jet printers have a resolution of 300 dots per inch. However, some inkjet printers have resolutions of 600 DPI or even 1200 DPI. Although the printer typically prints in CMY or CMYK subtractive colors, it is nevertheless convenient for image processing purposes at step 32 to consider the printer to be an RGB device. This is because three dimensions are sufficient to describe the color space of a device, and if the attempt is made to match the color monitor RGB values directly to CMYK or CMYLcLmK there will be numerous combinations of CMYK or CMYLcLmK that will produce a colorimetric match. However, not all of the matching values will produce the same image quality, because some choices will contain more visual noise than others, and some choices may lead to undesirable discontinuities in the halftone transitions of an image.

At step 34, the present invention converts the printer RGB color image into CMYK or CMYLcLmK color space. The choice between CMYK and CMYLcLmK is governed by an algorithm known by the trademark "ColorSmart" Imaging (TM, Hewlett-Packard Company). If the image would not appreciably benefit from enhanced color imaging, for example, computer graphics having solid color area fill, like those produced from computer charting applications or presentation packages, a more simple RGB to CMYK conversion may be used. If however, the image has areas of varying color levels, such as with scanned-in paintings or photographs, the method uses the RGB to CMYLcLmK conversion.

After the interpolator in step 34 is complete, the image has been converted from a three-plane (RGB) image to a six-plane (CMYLcLmK) image. Thus, in cyan and magenta, the printer has the option of low-dye-load dots. It is assumed that only a single dot of any type may is made, although additional numbers of droplets could be used. Thus, the printer is said to print in a 6-plane color space, and each plane has one bit per pixel per color.

Thus in step 36, the image is halftoned to convert the image from 6-plane near-analog color to 6-plane digital color. Halftoning is well known in the art, and typically uses a "dithering cell" that is "tiled" over the image. The same dither cell is used over the entire image. Each pixel in the cell has a threshold intensity level value that is compared against the analog or near analog image intensity level for that pixel. If the near-analog image intensity level is higher than the halftoning threshold value, a dot will be printed at that point; in other words, the digital color space will indicate a "1" for that pixel in that color. If the image intensity level is less than the halftoning threshold value, no dot will be printed, and the digital color space has a "0" for that color at that pixel. This process is repeated for each color in the color space. The threshold values in the particular dither cell used are established by a variety of techniques, each of which produces different results. Each halftoning technique also has its own unique undesirable artifacts. One of the reasons for using 6-plane digital color, rather than 4-plane color is to avoid some of these artifacts.

At step 38, the image is transmitted to the printer, typically using an efficient communication process, such as with escape sequences like those identified in Hewlett-Packard Company's Printer Control Language (PCL). The image produced at step 36 includes all of the information about how many dots of each color are printed at each pixel on the page. The printer controller decides when these dots should be printed, i.e., in a single pass, or in multiple passes. Because of the nature of inkjet printing, it is often beneficial to lay down dots in more than a single pass, and to print individual passes in some kind of checkerboard or other sparse pattern. It is also beneficial to overlap passes with these interstitial patterns to hide artifacts that may occur between swaths. These procedures for determining in what pass and in what pattern the dots will be laid down are referred to as "print modes." For example a useful overlapping and interstitial printing method is referred to as "shingling," because it is reminiscent of the way shingles are laid down on a roof.

It will be understood that, depending on the printer, various of the functions discussed in relation to FIG. 4 can be performed in the host computer or in the printer. For example, in a "smart" printer, steps 32 through 38 could all be performed in the printer. On the other hand, in a "dumb" printer (or a more complimentary term "sleek") printer, to save memory costs in the printer, all of the functions 30 through 38 could be performed in the host computer.

Figure 3:
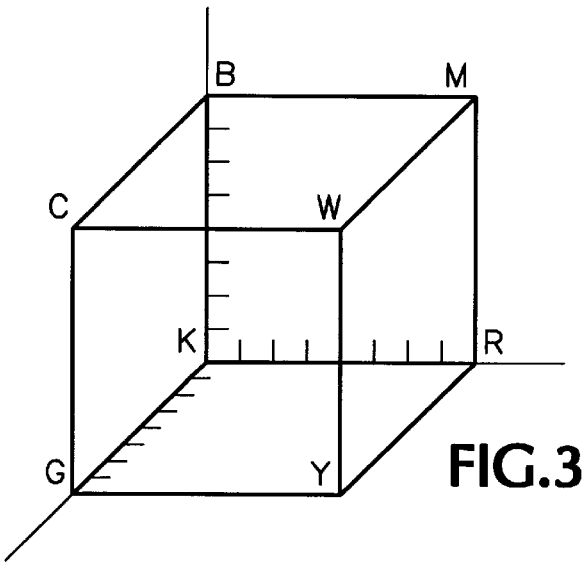
FIG. 3 is an illustration of an RGB color cube.

We now focus on the interpolation step 34, which converts the printer-based 24-bit 3-plane RGB image to the printer-based 6-plane CMYLcLmK image. The RGB's in an image may be thought of as members of a color space represented as a color cube in a three dimensional RGB color space, as shown in FIG. 3. In this space, R,G, and B form the axes of the color space, and the points at which full red, green and blue saturation occurs are the vertices R,G, B of the cube as shown.

As discussed in reference to FIG. 4 at step 32, the printer is fictitiously considered to print in RGB colors for purposes of color matching from the monitor to the printer, with the conversion to subtractive color space and halftoning later in the process. Three dimensions are sufficient to describe the color space of the printer. Also if the attempt were made to match the monitor RGB image directly to, for example CMYK, there would be numerous combinations of CMYK that would produce a calorimetric match for given RGB near analog values. However, not all of the matching CMYK values will produce the same print quality, because some choices may contain more visual "noise" than others, and some may lead to undesirable artifacts in the halftoned image.

When confronted with the illustrated printer 14 that has six different inks (CMYLcLmK), the problem of choosing the optimal ink combinations for each color becomes much more difficult. In printer 14, the low-dye inks are combined with high-dye inks to produce less visual noise in the lighter colors, in transitions between colors, and transitions from colors to black. For example as a light color such as yellow transitions to a dark color such as green, less visual noise is produced by first using low-dye load cyan in the more yellow regions, and then at a certain point when the image becomes dark enough, full-dye-load cyan along with yellow can be used without causing a grainy image.

The way that the disclosed six inks must be combined to maximize image quality is not trivial. The decisions must be based in part on empirical experience with actual results on the target media. The disclosed embodiment addresses the problem of combining multiple inks in a multi-dye-load printing system to attain a well behaved, smooth printer color space.

Because the actual printed results do not linearly correspond to an exact algebraic conversion from RGB to CMY or CMYK, it is possible, based on empirical results, to create a curve that shows the actual color seen (COUT, MOUT, YOUT, KOUT) over a given region that results from a linear increase in the intensity of single dye-load dot (CIN MN, YIN, KIN) in that region. As stated, this relationship is not linear. Thus, the amount of C,M, and Y to print are given by linearization curves:

$$C_{OUT}=F_1(C_{IN})$$

$$M_{OUT}=F_2(M_{IN})$$

$$Y_{OUT}=F_3(Y_{IN})$$

$$K_{OUT}=F_4(C_{IN}, M_{IN}, Y_{IN})$$

An extension of this procedure to multi-dye-load printing is to define "ramps" from white to cyan, white to magenta, white to yellow, and white to black with 6 dyes, so that there are nice transitions that use the light dyes in the lighter levels, while dark dyes are used as the ramp moves to the dark levels or black. Thus the amount of C,M,Y,Lc,Lm,Y, and K to print are given by the linearization curves:

$$C_{OUT}=F_1(C_{IN})$$

$$M_{OUT}=F_2(M_{IN})$$

$$Y_{OUT}=F_3(Y_{IN})$$

$$L_{OUT}=F_5(C_{IN})$$

$$L_{OUT}=F_6(M_{IN})$$

$$K_{OUT}=F_4(C_{IN}, M_{IN}, Y_{IN})$$

This method has several problems. The most fundamental problem is the assumption that all transitions within the color space can be achieved with linear combinations of the ink values in these curves. For example, somehow the transition from red to black is a linear combination of the inks used for the transitions from red to white and from white to black. This technique, however, results in bad transitions, particularly from solid colors to black. Furthermore, the summation of inks from this method may produce ink volumes that are too high for the media and can actually produce ink volumes that exceed 100%, which cannot be printed.

During transitions from certain colors to other colors, it is often preferable to use either exclusively high-dye-load ink or low-dye-load ink for cyan and magenta. For example in the case of the transition from W to K described, if high-dye-load black dots were used in a region almost devoid of other dots, such as in a region intended to be a very light gray, the high-dye-load black dots would show up starkly against the background of the other light areas, resulting in a grainy appearance. Even composite black produced by high-dye-load cyan and magenta in combination with high-dye-load yellow will produce a certain graininess in such a light gray region. However, if low-dye-load cyan and magenta and high-dye-load yellow (because yellow is a light color), are used, it will produce a more even and non-grainy gray appearance. At a certain point, the color is dark enough that using high-dye-load cyan, magenta, or black will not produce unacceptable graininess. Therefore, a control point can be established at which the algorithm can shift over to the high-dye-load dots. It is preferable to use high-dye-load dots if it can be done without diminishing image quality, because darker colors can be achieved. Also, the use of high dye-load dots results in less moisture on the page and is less expensive.

Creating a Conversion Table

The present invention provides transitions between low dye load dots and high dye load dots with the use of control points. To convert RGB to 6-plane data, a set of conversion tables are produced. The conversion table is a 3-dimensional matrix that is indexed by RGB and contains values for each of the 6 output planes: CMYLcLmK. The illustrated embodiment uses 9 steps (0 to 8) along each axis R,G, and B, corresponding to 9 points along each axis of the color cube shown in FIG. 3. Thus, these 9 points create a three dimensional matrix with 729 entries (9×9×9=729) in the color cube. In the algorithm, these entries are first set to an UNKNOWN, and are then completed in a four-step process.

Figure 5:
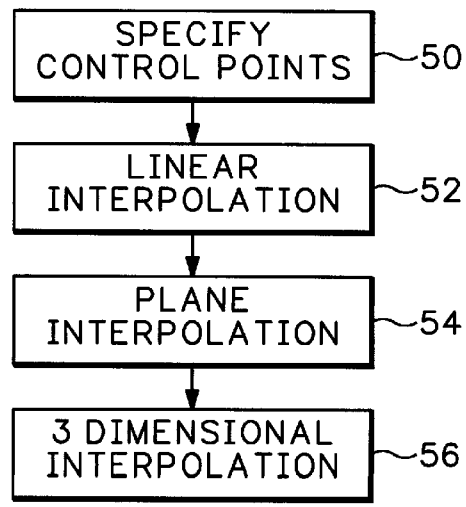
FIG. 5 is a flow diagram of a color conversion method of the invention.

This four-step process is described in reference to FIG. 5, as follows:
Step 1: Specify Control Points The first step (step 50, FIG. 5) in creating this table of 729 points is to specify certain control points. Control points are provided to specify transitions from white to black, from white to each of R,G,B,C,M, and Y, and from each of R,G,B,C,M, and Y to black. In addition, control points are used to specify the transitions between primaries and secondaries. For example, in the transition from yellow to red, first low-dye magenta, along with yellow, is used to create an orange color. After this, high dye magenta and yellow are used to complete the transition to red. To empirically develop the control points that are needed, once a set of control points are provided, test charts are printed, and additional control points may be specified as needed to insure smooth color transitions, maximum color gamut, and ink coverage. Depending on various factors, such as media and dye type, these control points can be somewhat more involved. The following are a set of 38 control points that has been found useful with plain paper and dye-based inks.

| (R,G,B) | C | M | Y | Lc | Lm | K |
|---|---|---|---|---|---|---|
| Black to White | | | | | | |
| (0,0,0) | 16 | 10 | 14 | 0 | 0 | 190 |
| (1,1,1) | 0 | 0 | 12 | 35 | 0 | 135 |
| (2,2,2) | 0 | 0 | 20 | 80 | 45 | 79 |
| (3,3,3) | 0 | 0 | 24 | 110 | 100 | 22 |
| (4,4,4) | 0 | 0 | 22 | 90 | 100 | 0 |
| (6,6,6) | 0 | 0 | 14 | 38 | 38 | 0 |
| (7,7,7) | 0 | 0 | 8 | 16 | 16 | 0 |
| (8,8,8) | 0 | 0 | 0 | 0 | 0 | 0 |
| White to Red to Black | | | | | | |
| (8,4,4) | 0 | 0 | 56 | 0 | 240 | 0 |
| (8,2,2) | 0 | 86 | 113 | 0 | 105 | 0 |
| (8,0,0) | 0 | 134 | 134 | 0 | 0 | 0 |
| (6,0,0) | 0 | 85 | 95 | 100 | 0 | 0 |
| (3,0,0) | 0 | 90 | 93 | 78 | 0 | 70 |
| (2,0,0) | 0 | 85 | 85 | 0 | 0 | 115 |
| White to Green to Black | | | | | | |
| (4,8,4) | 0 | 0 | 40 | 255 | 0 | 0 |
| (0,8,0) | 128 | 0 | 128 | 0 | 0 | 0 |
| (0,6,0) | 85 | 0 | 92 | 0 | 110 | 0 |
| (0,2,0) | 82 | 0 | 82 | 0 | 0 | 12 |
| White to Blue to Black | | | | | | |
| (5,5,8) | 0 | 0 | 0 | 170 | 170 | 0 |
| (0,0,8) | 120 | 120 | 0 | 0 | 0 | 0 |
| (0,0,2) | 85 | 85 | 0 | 0 | 0 | 115 |
| White to Yellow to Black | | | | | | |
| (8,8,0) | 0 | 0 | 208 | 0 | 0 | 0 |
| (6,6,0) | 0 | 0 | 165 | 25 | 25 | 0 |
| (4,4,0) | 0 | 0 | 140 | 50 | 50 | 55 |
| (2,2,0) | 0 | 0 | 120 | 0 | 0 | 170 |
| White to Magenta to Black | | | | | | |
| (8,5,8) | 0 | 0 | 0 | 0 | 255 | 0 |
| (8,0,8) | 0 | 208 | 0 | 0 | 0 | 0 |
| (6,0,6) | 0 | 166 | 20 | 120 | 0 | 0 |
| (2,0,2) | 0 | 150 | 0 | 0 | 0 | 170 |
| White to Cyan to Black | | | | | | |
| (5,8,8) | 0 | 0 | 0 | 255 | 0 | 0 |
| (0,8,8) | 208 | 0 | 0 | 0 | 0 | 0 |
| (0,6,6) | 166 | 0 | 20 | 0 | 120 | 0 |
| (0,2,2) | 160 | 0 | 0 | 0 | 0 | 170 |
| Yellow to Red | | | | | | |
| (8,5,0) | 0 | 0 | 180 | 0 | 255 | 0 |
| (8,3,0) | 0 | 58 | 185 | 0 | 140 | 0 |
| Yellow to Green | | | | | | |
| (5,8,0) | 0 | 0 | 190 | 147 | 0 | 0 |
| Magenta to Blue | | | | | | |
| (5,0,8) | 0 | 190 | 0 | 147 | 0 | 0 |
| Cyan to Blue | | | | | | |
| (0,5,8) | 190 | 0 | 0 | 0 | 147 | 0 |

Note that in the transition from White to Black there are 6 control points (not counting the vertices), which is more control points than between any other two vertices in the color cube. This larger number of control points is needed to avoid graininess in this transition because white is the lightest color and black is the darkest color. Close to black, to begin the transition to white, at first a high level of black is used, with some yellow. In this region of nearly full black, to begin to lighten the color, first some light cyan, then some light magenta is added, as the black dye is decreased. At (4,4,4), which is the exact center of the color cube, the transition is made to no black ink and to only yellow, light cyan and light magenta. Thus in the region closer to white, the lighter colors are used to create a light gray effect.

In the transition from white to red, there are two control points (8,4,4) and (8,2,2). Close to white, only yellow and light cyan are used. Past the midpoint (8,4,4) high magenta may be used in combination with light magenta. Only a single control point is provided in each of the transitions from white to green (4,8,4), white to blue (5,5,8), white to cyan (5,8,8), and white to magenta (8,5,8). In each of these cases, close to white, only Lc, Lm or Y are specified, and beyond the control point, closer to the other color, high dye C or M may be used. No control point is provided from white to yellow. Yellow is an output primary, and has no light dye version. Full dye load yellow dots in the presence of white is less likely than the other primaries to create a grainy appearance.

There are three control points from red and black. There are two control points in each of the transitions from green to black, yellow to black, magenta to black, and cyan to black. There is only one control point from blue to black. Since blue is a dark color, fewer control points are needed to avoid graininess in the transition from blue to black. Since yellow is a light color and red is a darker color, there are two control points between yellow and red, but only a single control point between yellow and green. Each of the transitions from magenta to blue and from cyan to blue also has just a single control point.

Thus, in transitions between dark and light colors, varying numbers of control points need to be established. As a general rule, the starker the difference in the "darkness" of the two colors, the more control points need to be established. The control points often provide positions at which the algorithm changes between use of the high dye-load and the low dye-load versions of cyan and magenta. Control points also provide changes in the use of composite black (C+Y+M) and true black.

Step 2: Linear Interpolation

After the control points are provided, the second step (step 52, FIG. 5) of the method is to use linear interpolation to fill in the remaining unknown points corresponding to the 729 entries in the RGB color cube matrix. This interpolation must be done in a way that gives consistent transitions through hue, lightness, and chroma (three standard variables in evaluating color correctness). In order to insure consistent transitions, a stepwise approach is used to fill out the rest of the matrix. The interpolation begins by using linear interpolation to compute results for the UNKNOWN points along the following space transitions:

| Black/White Transition | | |
|---|---|---|
| (0,0,0) to (8,8,8) K to W | | |
| Black/Color Transitions | | |
| (0,0,0) to (0,0,8) K to B | (0,0,0) to (8,0,0) K to R | (0,0,0) to (0,8,0) K to G |
| (0,0,00) to (8,8,0) K to Y | (0,0,0) to (0,8,8) K to C | (0,0,0) to (8,0,8) K to M |
| White/Color Transitions | | |
| (8,8,8) to (0,0,8) W to B | (8,8,8) to (8,0,0) W to R | (8,8,8) to (0,8,0) W to G |
| (0,8,8) to (8,8,0) W to Y | (8,8,8) to (0,8,8) W to C | (8,8,8) to (0,8,0) W to M |
| Primary/Secondary Transitions | | |
| (0,8,8) to (0,8,0) C to G | (8,8,0) to (8,0,0) Y to R | (8,8,0) to (0,8,0) Y to G |
| (8,0,8) to (0,8,8) M to B | (0,8,8) to (0,0,8) C to B | (8,0,8) to (8,0,0) M to R |

Step 3: Plane Interpolation

The next interpolation step (step 54, FIG. 5) fills out the conversion table entries for the planes that constitute the outer surface of the color cube, and three planes that intersect the neutral axis. The points that define these planes are as follows:

Six cube sides:

White, Yellow, Red, Magenta       White, Cyan, Green, Yellow
White, Magenta, Blue, Cyan        Black, Green, Yellow, Red
Black, Blue, Magenta, Red         Black, Green, Cyan, Blue
Three neutral Planes Black, Red, White, Cyan
Black, Green, White, Magenta
Black, Blue, White, Yellow For each UNKNOWN point in each plane, a four-way distance weighted average is used. This distance-weighted interpolation is computed as follows:

Total Distance=Sum of distances for all points (in each of four directions in that plane)
  Norm Factor=Sum of (Total Distance/distance [i] ) for all points i
  Result=0
  For all points i
    Result=Result+(Point[i] * (Total Distance/Distance [i]))/Norm Factor A problem arises when interpolating with the method described above for multi-dye-load printing as illustrated herein. When doing the four way interpolating, if any point that is interpolated from contains a non-zero high-dye value, then the results of the interpolation will probably contain a high dye. This would lead to the propagation of high dye ink values in the interpolated entries in the color cube, which would disadvantageously increase granularity for many color values. The solution to this problem is to implement a "dark dye filter." The following filter has been found to be useful:

dark dyes=dark cyan, dark magenta, and black light dyes=light cyan, light magenta, and yellow a. The four neighboring points are divided into opposing pairs b. If one pair only contains light dyes, and the other pair contains some dark dye, then the pair containing dark dye is thrown out and the remaining points are used for computing the weighted average.

c. However, if there is only one point that contains a particular dark dye, then the dark dye content is discarded and replaced with some amount of light dye. For example, if only one point contains black, then that black is discarded and replaced with some amount of light composite black composed of light cyan, light magenta, and yellow. The four points are then used to compute the weighted average.

Step 4: 3D Interpolation

The final step (step 56, FIG. 5) is to fill out the rest of the color table by using a 3D interpolation method. At this point in the algorithm, the color space has been nicely divided into segments with planes containing well-behaved transitions. The rest of the points in the color conversion table are computed by using a 6-way interpolation. The closest neighbors above, below, forward, back and to the right and left are used to compute the point in question. Similar to the 4-way interpolation, a filter is also needed to insure that dark-dye ink does not propagate through the color space. The filter that is used is exactly the same as that described in the previous step, except it applies to three pairs of points, instead of two. The interpolation is also exactly as described in step 3, except at most 6 points are used, instead of at most 4.

Advantages

The disclosed technique provides a flexible method for controlling ink volumes and transitions through the color space of an output device. In addition to the specific application described above, this technique can also be applied to similar problems in creating device color spaces. In the case described above, the input values are RGB and the output values are CMYLcLmK. This algorithm could also be used to specify the ink amounts used for other input color spaces, such as CMY or a device independent color space such as CIEL*a*b*. In the case of a CIE Lab color space input, ink control points would have to be chosen to best match the input Lab value, and these ink values would interpolated to give a smooth transition in the printer space between Lab values.

This approach also applies for the case when the output inks of the device are different from those in the illustrated printer system. For example, in certain printers multiple same-size and same-dye-load drops of primary colors are used to extend the printer's gamut of reproducible colors. Another printer might use an ink set including CMYRGB, or some sub-combination of these colors. The present method would work well in handling the ink transitions of such cases.

Furthermore, because the present method provides color transform tables, the implementation of the disclosed algorithm is simple and efficient. Color transform tables are simply loaded into the driver, and the driver responds to these color transform tables the same way many drivers currently handle color map interpolation algorithms.

I claim:

1. A color conversion method for converting from a near-analog color space to a multi-dimensional output color space, said output color space having at least one color that has at least two output options, the method comprising:

providing a set of control points within said near-analog color space, each of said control points having a corresponding set of parameters in said output color space, said control points providing transitions between said options of said at least one color having said at least two output options; and interpolating selected points within said near-analog color space between said control points to determine parameters of said selected points in said output color space;

wherein said output options are provided by varying colorant loadings in inkjet inks; and wherein said output color space is comprised of at least the colors CMYLcLm, where Lc is low-dye-load cyan and Lm is a low-dye-load magenta; and wherein at least a portion of said control points provide transitions between the use of high-dye-load inks and low-dye-load inks.

2. A printer using a color conversion method for converting from a near-analog color space to a multi-dimensional output color space, said output color space having at least one color that has at least two output options, the printer being operated to:

provide a set of control points within said near-analog color space, each of said control points having a corresponding set of parameters in said output color space, said control points providing transitions between said options of said at least one color having said at least two output options; and interpolate selected points within said near-analog color space between said control points to determine parameters of said selected points in said output color space;

wherein said output options are provided by varying colorant loadings in inkjet inks; and wherein said output color space is comprised of at least the colors CMYLcLm, where Lc is low-dye-load cyan and Lm is a low-dye-load magenta, and wherein at least a portion of said control points provide transitions between the use of high-dye-load ink and low-dye-load inks.

\* \* \* \* \*

UNITED STATES PATENT AND TRADEMARK OFFICE
CERTIFICATE OF CORRECTION

PATENT NO. : 5,982,990                                                                 Page 1 of 2

DATED      : November 9, 1999

INVENTOR(S) : Gondek

It is certified that error appears in the above-identified patent and that said Letters Patent is hereby corrected as shown below:

Column 2, (line 37), after "the available choices" delete "available".

Column 3, (line 16), delete "near analog" and insert therefor --near-analog--.

Column 4, (line 9), delete "14" and insert therefor --10--.

Column 4, (line 62), after "type" delete "may".

Column 5, (line 5), delete "near analog" and insert therefor --near-analog--.

Column 5, (line 62), delete "near" and insert therefor -- near- --.

Column 6, (line 23), delete "(COUT, MOUT," and insert therefor --($C_{OUT}$, $M_{OUT}$,--.

Column 6, (line 24), delete "YOUT, KOUT)" and insert therefor --$Y_{OUT}$, $K_{OUT}$)--.

UNITED STATES PATENT AND TRADEMARK OFFICE
CERTIFICATE OF CORRECTION

PATENT NO. : 5,982,990

DATED : November 9, 1999

INVENTOR(S) : Gondek

It is certified that error appears in the above-identified patent and that said Letters Patent is hereby corrected as shown below:

Column 6, (line 25), delete "(CIN MN," and insert therefor --$(C_{IN}, M_{IN},$--.

Column 6, (line 26), delete "YIN, KIN)" and insert therefor --$Y_{IN}, K_{IN})$--.

Column 6, (line 49), delete "$L_{OUT}=F_5(C_{IN})$" and insert therefor --$Lc_{OUT}=F_5(C_{IN})$--.

Column 6, (line 51), delete "$L_{OUT}=F_6(M_{IN})$" and insert therefor --$Lm_{OUT}=F_6(M_{IN})$--.

Column 9, (line 48), delete "(0,0,00)" and insert therefor --(0,0,0)--.

Column 11, (line 31), after "would" insert --be--.

Signed and Sealed this

Twenty-seventh Day of March, 2001

*Attest:*

NICHOLAS P. GODICI

*Attesting Officer*    *Acting Director of the United States Patent and Trademark Office*